United States Patent
Myung

(10) Patent No.: US 6,912,712 B1
(45) Date of Patent: Jun. 28, 2005

(54) REAL TIME CONTROL SYSTEM FOR MULTITASKING DIGITAL SIGNAL PROCESSOR USING READY QUEUE

(75) Inventor: Yun-chan Myung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 570 days.

(21) Appl. No.: 09/685,877

(22) Filed: Oct. 11, 2000

(30) Foreign Application Priority Data

Oct. 11, 1999 (KR) .......................................... 1999-43749

(51) Int. Cl.[7] .............................................. G06F 9/46
(52) U.S. Cl. ..................... 718/101; 718/100; 718/102
(58) Field of Search ................. 718/100–102; 712/35; 710/44, 264; 709/100, 101, 102

(56) References Cited

U.S. PATENT DOCUMENTS

| | | | | |
|---|---|---|---|---|
| 5,291,614 A | * | 3/1994 | Baker et al. ................... | 712/35 |
| 5,553,293 A | * | 9/1996 | Andrews et al. ............ | 710/261 |
| 5,583,792 A | * | 12/1996 | Li et al. ...................... | 709/224 |
| 5,748,468 A | * | 5/1998 | Notenboom et al. ........... | 700/3 |

* cited by examiner

Primary Examiner—Meng-Al T. An
Assistant Examiner—Nilesh Shah
(74) Attorney, Agent, or Firm—Sughrue Mion, PLLC

(57) ABSTRACT

A real time control system capable of accurately supporting the real time characteristics of a multitasking digital signal processor (DSP) which requires an operating system (OS), is provided. In this real time control system, a ready queue and a waiting queue each includes a priority link having information indicating the first task control block and the last task control block among task control blocks of the same priority in a multitasking environment, and a queue link having information indicating the first task control block and the last task control block among tasks for a DSP according to the purpose of use. Timer control blocks are managed using a timer wheel having a pointer arrangement structure. A memory is divided into an internal memory and an external memory, and thus the internal and external memories are managed respectively at user 월 request. Therefore, the real time characteristics of multitasking DSPs can be accurately supported by eliminating the non-deterministic characteristics as much as possible.

13 Claims, 5 Drawing Sheets

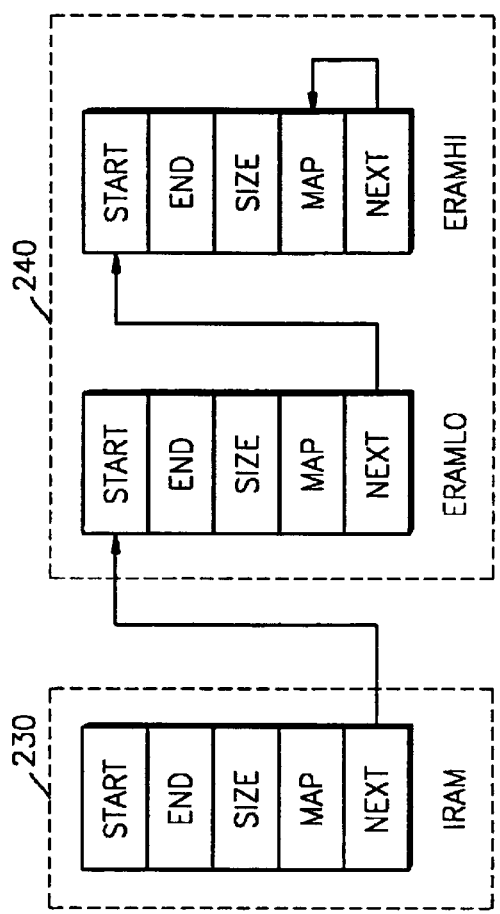

REAL TIME CONTROL SYSTEM FOR MULTITASKING DIGITAL SIGNAL PROCESSOR USING READY QUEUE

BACKGROUND OF THE INVENTION

1. Field of the Invention

The present invention relates to a digital signal processor (hereinafter, referred to as a DSP), and more particularly, to a real-time control system which can accurately support the real-time characteristics of a multitasking DSP which must use an operating system (hereinafter, referred to as an OS).

2. Description of the Related Art

As the market of DSPs expands, the application field of DSPs becomes wide to the extent of exceeding the growth speed of general purpose processors. Considering the current development of an information communications field and the further growth possibility of digital home appliance market, DSPs are a field that can be infinitely developed.

In such DSPs, software is given much weight, since DSPs must realize a signal processing algorithm. Also, DSPs require many numerical operation processes. Hence, the use of an OS is indispensable for DSPs that must concurrently perform several operations, such as, for industrial-use embedded systems. DSPs also must achieve real time signal processing, which requires the use of an OS such as a real-time kernel instead of an existing general purpose OS.

The operation of an existing real-time kernel will now be described on the basis of a queue_link management structure and in a memory management structure.

FIG. 1A shows a ready queue_link management structure of an existing real-time kernel. A ready queue_link 100 is a layer which switches between tasks on the basis of a list of tasks waiting to be allocated, using a processor such as a CPU. Each of the tasks is controlled on the basis of a corresponding task control bank (TCB) 110, 120 or 130. Each of the TCBs 110, 120 and 130 includes information associated with a corresponding task or information representing the states of resources.

The management structure of a real time kernel with respect to the ready queue_link 100 shown in FIG. 1A has a double linked list using a forward link (hereinafter, referred to as a flink) and a backward link (hereinafter, referred to as a blink). The linked list varies according to the location where a new task is added. For example, when a TCB for a new task is added between the TCB 110 and the TCB 120, the flink and blink in each of the TCBs 110 and 120 are updated to be connected to the newly-added TCB.

The real-time kernel having the above-described ready queue link management structure searches for the TCB for a task having the highest priority along the flinks. For example, when the ready queue link 100 indicates the TCB 110, the TCB 110 is checked if it is for a task having the highest priority. If it is determined that the TCB 110 is not for a task having the highest priority, the TCB 120 is searched for along the flink of the TCB 110 and checked whether the TCB 120 is for a task having the highest priority. This searching and checking process is repeated until a TCB having the highest priority is found or the connection of flinks ends.

Accordingly, the time taken for a real-time kernel to perform queuing varies depending on the number of tasks connected. That is, as the number of tasks connected increases, the time required for task searching increases. This non-deterministic management structure is not applied only to the ready queue link 100 but is also applied to a waiting queue link which operates on the basis of a task list for securing resources, and to a timer that controls the operating time of a task for each event. However, the non-deterministic management structure cannot sufficiently satisfy the requirement for real time processing in DSPs.

FIG. 1B shows a memory management structure of an existing real-time kernel. As can be seen from FIG. 1B, an existing real-time kernel manages memories in a structure where a physical memory has one to one correspondence to a logical memory. That is, an existing real-time kernel manages memories, which are physically arranged in the order of RAM, FLASH and ROM, to logically arrange the memories in the order of ROM, FLASH and RAM, as shown in FIG. 1B. Also, when various types of memories are mixed, an existing real-time kernel can manage memories so that a ROM is particularly discriminated and used, while the remaining memories are used indiscriminately at user 될 request.

DSPs require a multiple memory structure in which, when fast processing is required, the internal memory of a DSP is allocated, and, when fast processing is not required, the external memory of the DSP is allocated. However, in the above-described memory management structure of an existing real-time kernel, memories are not managed by discriminating between the internal memory and the external memory. Thus, users must manage memories separately from an OS, in order to achieve the above-described memory management of DSPs.

SUMMARY OF THE INVENTION

To solve the above problem, an objective of the present invention is to provide a real-time control system capable of accurately supporting the real-time characteristics of a multitasking digital signal processor (DSP) that must use an operating system (OS).

Another objective of the present invention is to provide a real-time control system capable of supporting the real-time characteristics of a multitasking DSP by establishing a deterministic queue management structure of an OS.

Still another objective of the present invention is to provide a real-time control system capable of supporting the real-time characteristics of a multitasking DSP by establishing the timer management structure of an OS into a pointer arrangement structure.

Still yet another objective of the present invention is to provide a real-time control system capable of supporting the real-time characteristics of a multitasking DSP by establishing the memory management structure of an OS into a multiple memory management structure.

To achieve the above objective, a real time control system of a multitasking digital signal processor according to the present invention includes: a ready queue including a ready queue link having first information (a list pointer and a last pointer) indicating the task control block for the first task among tasks in the digital signal processor, and the task control block for the last task, and a priority link group of priority links, the number of which is the same as the number of priority levels, having second information (a list pointer and a last pointer) indicating the task control block for the first task among tasks of the same priority among the tasks, and the task control block for the last task; and an operating system (kernel) for setting the first and second information according to the conditions of tasks for the digital signal processor, and controlling switching between the tasks of the ready queue.

Preferably, the real time control system further includes a waiting queue including a waiting queue link including third information indicating the task control block for the first task among tasks in the digital signal processor, and the task control block for the last task, and a priority link group of priority links, the number of which is the same as the number of priority levels, having fourth information indicating the task control block for the first task among tasks of the same priority among the tasks, and the task control block for the last task. Here, the operating system sets the third and fourth information so that resources for the tasks of the waiting queue are deterministically acquired.

It is preferable that the real time control system further includes a timer wheel for managing the timer control blocks for the tasks in a pointer arrangement structure, wherein the operating system inserts the timer control blocks into corresponding slots of the timer wheel according to the time set for the tasks.

In the real time control system, preferably, a memory used to process the tasks in the digital signal processor is divided into an internal memory and an external memory in the digital signal processor, and the operating system manages the internal memory and the external memory using a memory structure made up of a start address, an end address, a memory size, a memory map, and next information indicating the start address of the next memory to be connected.

BRIEF DESCRIPTION OF THE DRAWINGS

The above objectives and advantage of the present invention will become more apparent by describing in detail preferred embodiments thereof with reference to the attached drawings in which:

FIG. 5 is an exemplary view of a memory management structure of an OS according to the present invention; and FIG. 6 is an exemplary view of a timer wheel management structure of an OS according to the present invention.

DESCRIPTION OF THE PREFERRED EMBODIMENT

Figure 1A:
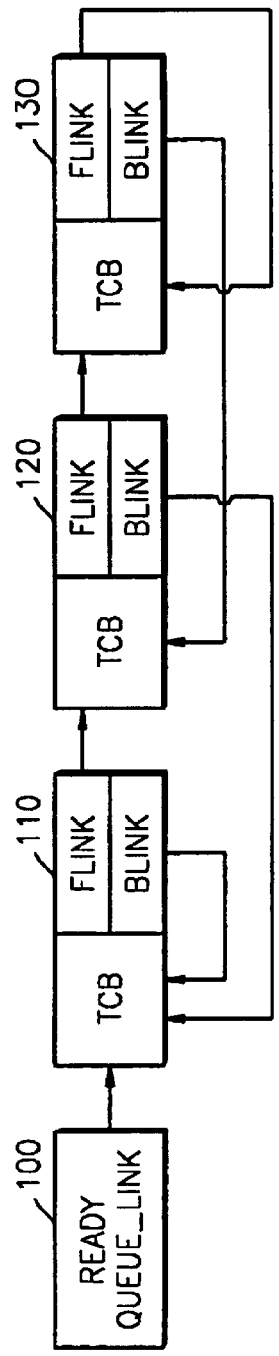
FIGS. 1A and 1B are exemplary views for explaining the ready queue management structure and a memory management structure of a conventional real-time kernel, respectively.
Figure 1B:
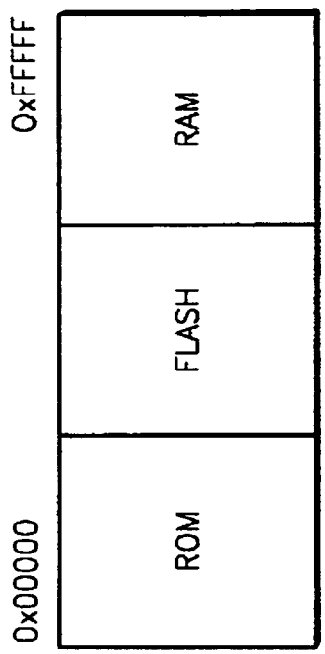
Figure 2:
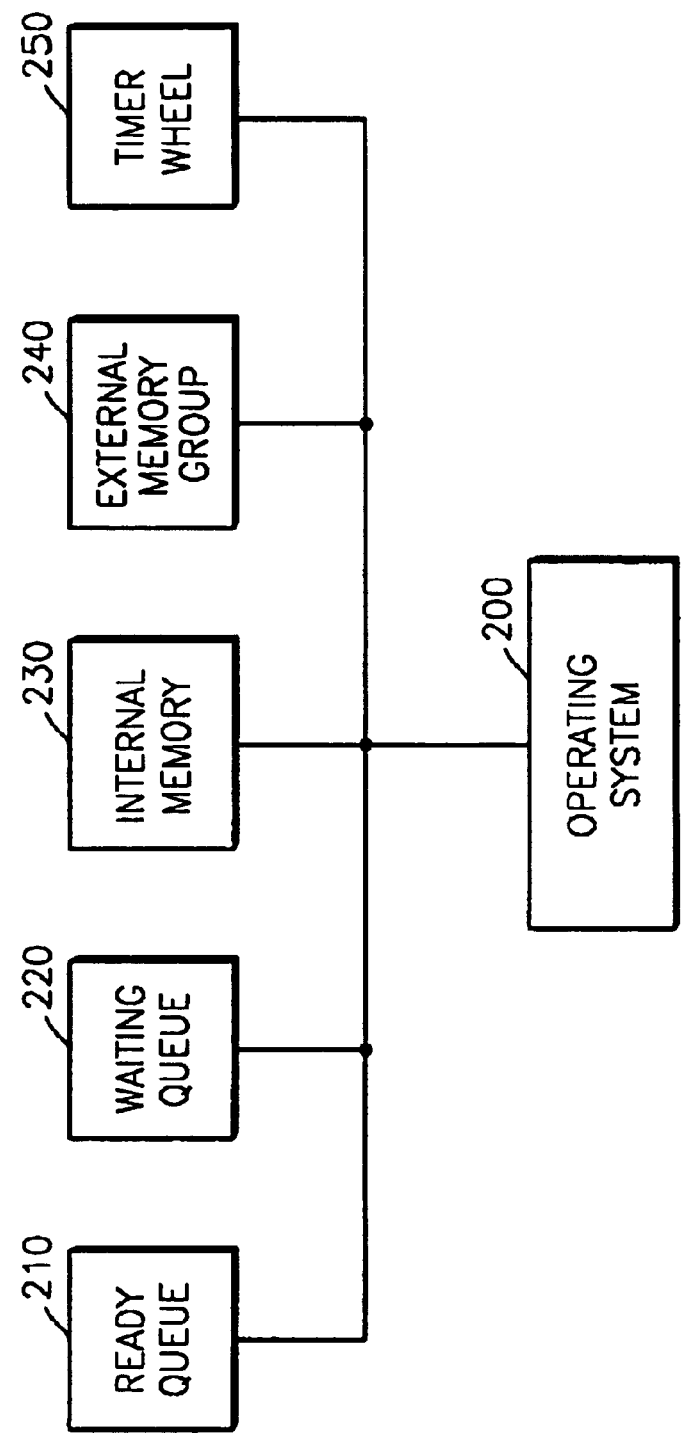
FIG. 2 is a block diagram of a real-time control system for DSPs according to a preferred embodiment of the present invention.

Referring to FIG. 2, a real time control system for a DSP according to the present invention is made up of an operating system 200 for supporting the real time characteristics of a multitasking DSP, a ready queue 210 and a waiting queue 220 designed to have a deterministic characteristic, an internal memory 230 and an external memory group 240 which enable multiple memory management, and a timer wheel 250 for managing the timer of a task for each event in a pointer arrangement structure.

Figure 3:
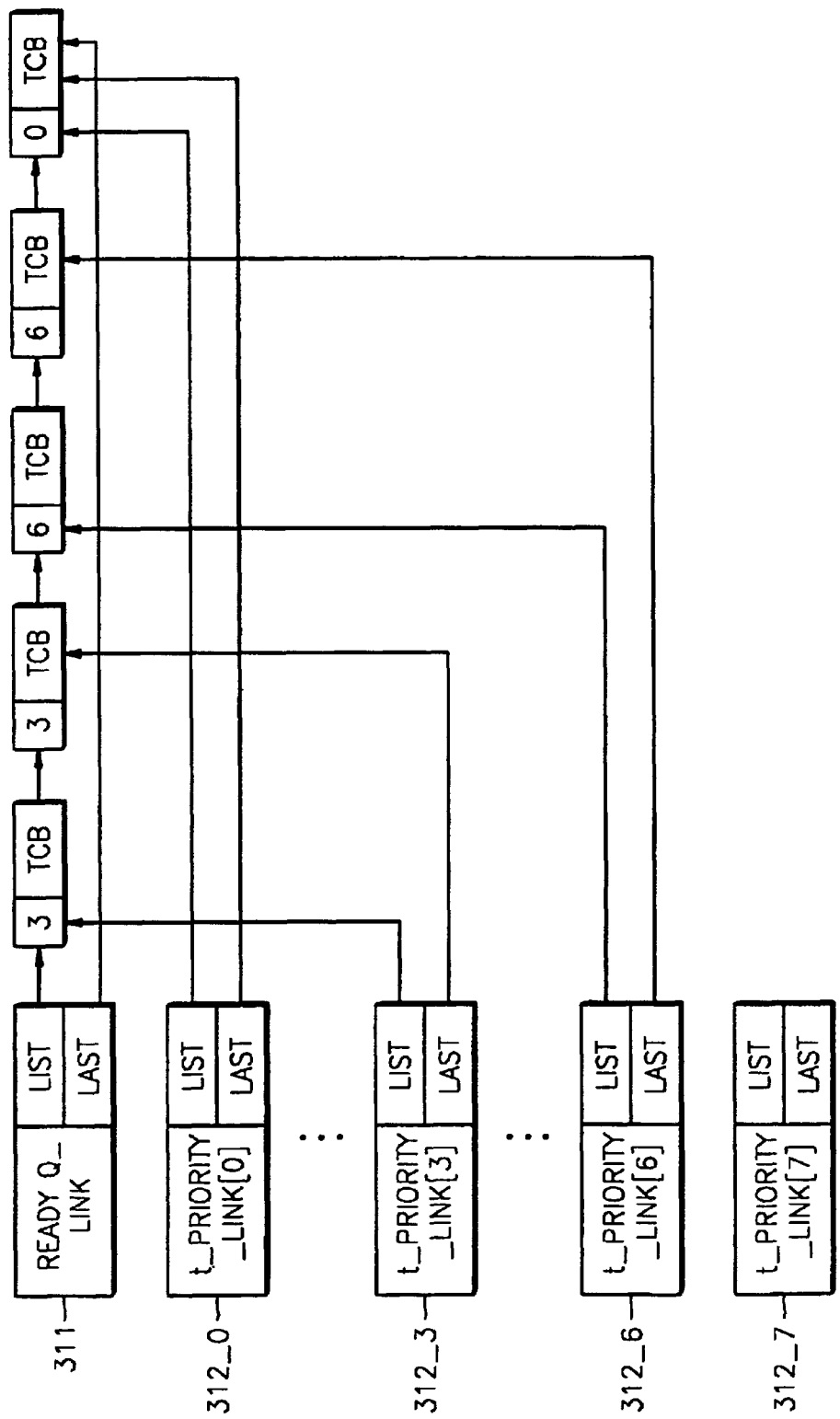
FIG. 3 is an exemplary view of a ready queue management structure of an OS according to the present invention.

The ready queue 210 can include a ready Q_link 311 having a list pointer indicating the first task control block (TCB) among tasks, and a last pointer indicating the last TCB, as shown in FIG. 3. The ready queue 210 can also include priority links 312_0 through 312_7, the number of which is the same as the number of priority levels, each having a list pointer indicating the first TCB among TCBs having the same priority and a last pointer indicating the last TCB.

Figure 4:
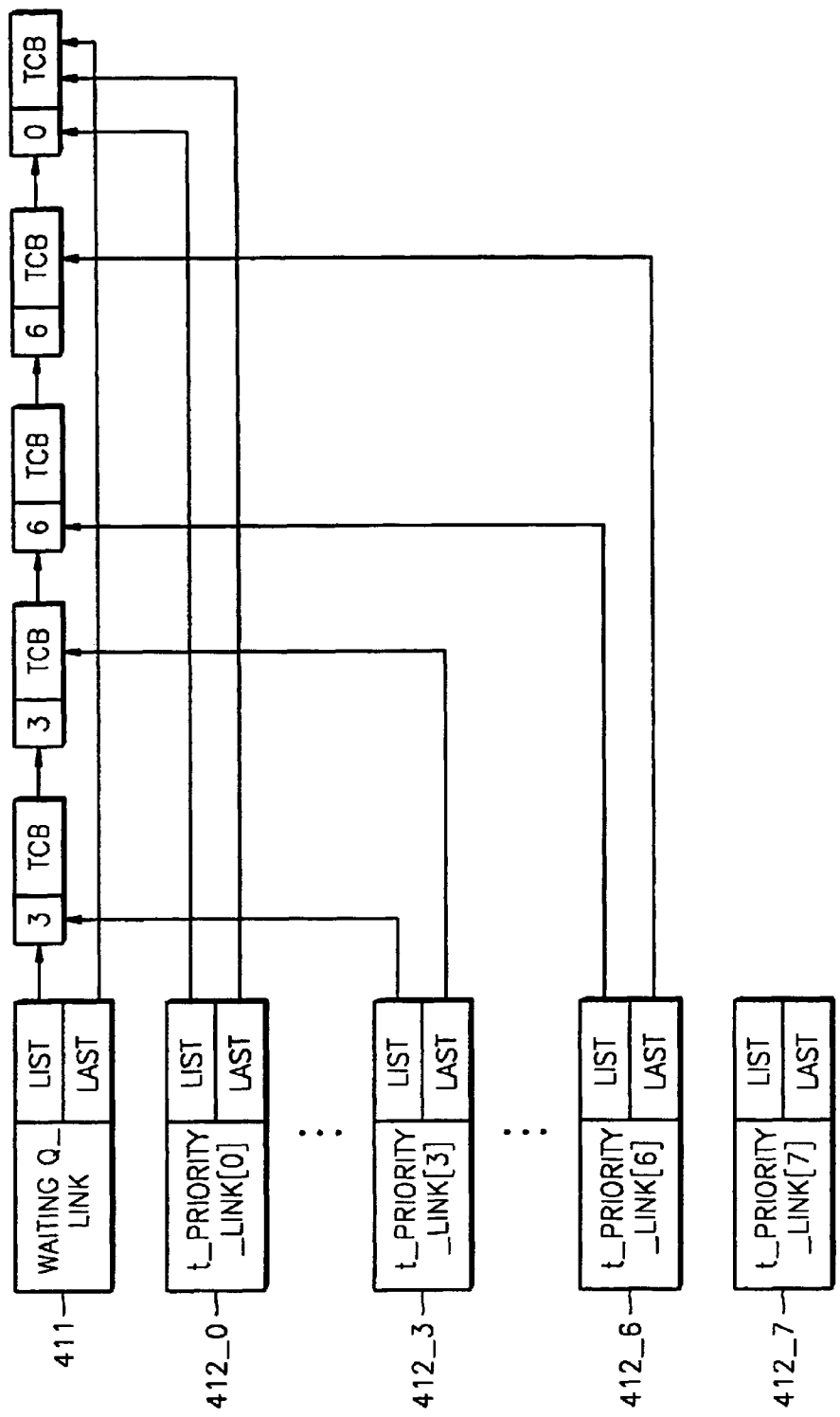
FIG. 4 is an exemplary view of a waiting queue management structure of an OS according to the present invention.

The waiting queue 220 can include a waiting Q_link 411 having a list pointer indicating the first TCB, among tasks, and a last pointer indicating the last TCB, as shown in FIG. 4. The waiting queue 220 can also include priority links 412_0 through 412_7, the number of which is the same as the number of priority levels, each having a list pointer indicating the first TCB among TCBs of the same priority and a last pointer indicating the last TCB.

The internal memory 230 and the external memory group 240 are managed by the operating system 200. In order for the operating system 200 to allocate and return the internal memory 230 and the external memory group 240, management structures such as IRAM, ERAMLO and ERAMHI can be included, each made up of a start address start, an end address end, a memory size size, a memory map map, and next information next indicating the start address of the next memory to be connected, as shown in FIG. 5.

The timer wheel 250 can manage timer control blocks (hereinafter, referred to as TMCBs) in a point alignment structure, as shown in FIG. 6, in order to have deterministic time characteristics even when there are timers for a plurality of events. FIG. 6 shows the case that the timer wheel 250 is made up of two timer wheels.

The operating system 200 sets the list pointer and last pointer of each of the ready queue 210 and the waiting queue 220 and searches for or adds a task using the set list pointer and the set last pointer, in order to deterministically perform scheduling for switching between tasks and for securing resources. Also, the operating system 200 manages the internal memory 230 and the external memory group 240, depending on whether fast processing is required and the conditions for allocating memories. The operating system 200 can be constructed to insert the headers of TMCBs into the slots of the timer wheel 250 according to the operating time of a task for each event, and to control the timer for each event of a DSP using the inserted headers of TMCBs.

The operation of a real time control system for a DSP according to the present invention having such a structure will now be described.

FIG. 3 is an exemplary view of a ready queue management structure of an OS according to the present invention. Referring to FIG. 3, the ready queue 210 is managed using one ready queue link 311 and eight priority links 312_0 through 312_7. The operating system 200 can detect the first task using the data set at the list pointer of the ready queue link 311 without undergoing searching for all tasks, and can add a new TCB using the data set at the last pointer of the ready Q_link 311.

Accordingly, upon TCB searching based on the first-in first-out (FIFO) system, the operating system 200 can rapidly detect a desired TCB using the list pointer of the ready Q_link 311.

Also, upon TCB searching based on the priority order, the operating system 200 uses the priority links 312_0 through 312_7. That is, each of the priority links 312_0 through 312_7 has a list pointer indicating the first TCB among TCBs having a corresponding priority, and a last pointer indicating the last TCB among them. For example, the priority line 312_0 has a list pointer indicating the first TCB among TCBs having the same priority level of 0, and a last pointer indicating the last TCB among them. Accordingly, the operating system 200 can rapidly detect a TCB having a priority of 0 using the priority link 312_0. Since there is only one TCB having a priority of 0, as shown in FIG. 3, the list pointer and the last pointer of the priority link 312_0 record the data associated with the same TCB.

When a new scheduling process for multi tasks is required, the operating system 200 can update the data of the list pointer and last pointer of each of the priority links 312_0 through 312_7 according to a desired scheduling process in the order of priority of TCBs, in order to achieve switching between tasks. Also, the operating system 200 updates the data of the list pointer and last pointer of the ready queue link 311, in order for the updated values of the list pointer and last pointer of each of the priority links 312_0 through 312_7 to be reflected on the data of the list pointer and last pointer of the ready queue link 311.

FIG. 4 is an exemplary view of a waiting queue management structure of an OS according to the present invention. The waiting queue management structure of FIG. 4 is similar to the ready queue management structure of FIG. 3.

That is, the waiting queue management structure of FIG. 4 includes a waiting queue link 411 and priority links 412_0 through 412_7. The waiting queue link 411 has a list pointer indicating the first TCB, and a last pointer indicating the last TCB, in order to acquire resources. Each of the priority links 412_0 through 412_7 has a list pointer indicating the first TCB, among TCBs having the same priority, and a last pointer indicating the last TCB, in order to acquire resources. Accordingly, the operating system 200 can rapidly detect a desired TCB to acquire resources, as in the above-described ready queue 210.

Also, when a new scheduling process for multi tasks is required, the operating system 200 can update the data of the list pointer and last pointer of each of the priority links 412_0 through 412_7 and the waiting queue link 411 according to a desired scheduling process, as in the above-described ready queue 210.

FIG. 5 is an exemplary view of a memory management structure of an OS according to the present invention. In FIG. 5, a memory is managed by discriminating between the internal memory 230 and the external memory group 240 made up of a low external memory ERAMLO and a high external memory ERAMHI.

In order to manage the internal memory 230 and the external memory group 240 on the basis of the management structure shown in FIG. 5, the operating system 200 performs memory allocation and memory returning using a system call method. The memory allocation and memory returning are performed in units of predetermined-sized pages, in order to minimize fragmentation caused during memory allocation and returning. The size of a page is determined by a user during compiling. The space of a memory is managed by checking the allocation or non-allocation of a memory using a memory map having a bit map structure.

Also, when fast processing is requested by a user, the operating system 200 allocates a memory space to the internal memory 230 so that a coefficient frequently used is stored in the internal memory 230. Here, when the internal memory 230 is completely allocated, the operating system 200 manages memories so that the external memory group 240 is used.

Furthermore, upon context exchanging, the operating system 200 controls a currently-executed addressing mode and pointer to be stored in the TCB for a previous task, and supports modular addressing and circular addressing that are the characteristics of DSPs.

FIG. 6 is an exemplary view of a timer wheel management structure of an OS according to the present invention, the structure made up of two timer wheels [0] and [1]. The operating system 200 inserts TMCB headers corresponding to tasks whose operating times, which are set by events, are equal to or less than the reference time (for example, 640 $\mu$s), into the slots of the first timer wheel [0]. A TMCB header includes information associated with a corresponding TCB, and information associated with the operating time of a corresponding task.

Also, the operating system 200 inserts the TMCB headers for tasks whose operating times, which are set by events, are greater than the reference time and equal to or less than twice the reference time, into the slots of the second timer wheel [1]. However, the operating system can manage the timers for tasks so that error is generated, when the operating time of a task is greater than twice the reference time.

In the present invention as described above, when multi-tasking scheduling based on FIFO or priority is required upon multi-tasking of a DSP, a queue link management structure is established so that information associated with the TCB for the first task and the TCB for the last task is provided. Thus, the TCB for a desired task can be detected at high speed.

Also, when the timer of a task for each event is expired, the time required for searching for the next task can be predicted by managing the timer control block for a task for each event in a timer wheel way.

A multiple memory management structure, in which memories are classified into an internal memory and an external memory, and information such as a coefficient frequently used is stored in the internal memory when fast processing is requested by users, is established, so that particularly the time for performing repetitive operation such as an operation for implementing an FIR filter is greatly reduced.

Terminology in the Detailed Description of the Invention is defined in consideration of the function of the present invention, so that it can vary according to the intention of one skilled in the art or the practice. Thus, the terminology must be defined on the basis of the overall content of the present application.

Although the invention has been described with reference to a particular embodiment, it will be apparent to one of ordinary skill in the art that modifications to the described embodiment may be made without departing from the spirit and scope of the invention.

What is claimed is:

1. A real time control system of a multitasking digital signal processor, comprising:
   a ready queue comprising:
      a ready queue link, the ready queue link comprising first information indicating a first task control block for a sequentially first task among tasks in the digital signal processor, and a second task control block for a sequentially last task among the tasks in the digital signal processor, and
      a first priority link group of first priority links, a number of the first priority links being equal to a number of priority levels of the tasks in the digital signal processor, each of said first priority links having second information indicating a third task control block for a sequentially first task among respective tasks having a same priority as each of said first priority links, among the tasks in the digital signal processor, and a fourth task control block for a sequentially last task among the respective tasks having the same priority as each of said first priority links;
and an operating system for setting the first and second information according to conditions of the tasks in the digital signal processor, and controlling switching between tasks of the ready queue.

2. The real time control system of claim 1, wherein the first information comprises a first pointer corresponding to the first task control block and a second pointer corresponding to the second task control block, and the second information comprises a third pointer corresponding to the third task control block and a fourth pointer corresponding to the fourth task control block.

3. The real time control system of claim 1, wherein the operating system updates the first and second information so that deterministic scheduling with respect to the ready queue link and the first priority links is maintained, when a task for the digital signal processor is inserted or deleted.

4. The real time control system of claim 1, further comprising a waiting queue, the waiting queue including:

a waiting queue link comprising third information indicating the first task control block for the sequentially first task among the tasks in the digital signal processor, and the second task control block for the sequentially last task among the tasks in the digital signal processor, and a second priority link group of second priority links, a number of the second priority links being equal to the number of priority levels of the tasks in the digital signal processor, each of said second priority links having fourth information indicating the third task control block for the sequentially first task among the respective tasks having the same priority as each of said second priority links, among the tasks in the digital signal processor, and the fourth task control block for the sequentially last task among the respective tasks having the same priority as each of said second priority links, wherein the operating system sets the third and fourth information so that resources for tasks of the waiting queue are deterministically acquired.

5. The real time control system of claim 4, wherein the third information comprises a fifth pointer corresponding to the first task control block and a sixth pointer corresponding to the second task control block, and the fourth information comprises a seventh pointer corresponding to the third task control block and an eighth pointer corresponding to the fourth task control block.

6. The real time control system of claim 1, wherein the operating system controls the ready queue so that switching between the tasks is achieved on a basis of the first priority link group, when task searching in the digital signal processor is based on an order of the priority of the tasks, and controls the ready queue so that switching between the tasks is achieved on a basis of the ready queue link, when the task searching is based on a first-in first-out (FIFO) system.

7. The real time control system of claim 1, further comprising a timer wheel for managing timer control blocks for the tasks in a pointer arrangement structure, wherein the operating system inserts the timer control blocks into corresponding slots of the timer wheel according to a time set for the tasks in the digital signal processor.

8. The real time control system of claim 7, wherein the timer wheel is divided into two timer wheels according to a predetermined reference time, and the operating system inserts timer control blocks corresponding to slots of the first timer wheel when the time set for the tasks is equal to or less than the predetermined reference time, and inserts timer control blocks corresponding to slots of the second timer wheel when the time set for the tasks is greater than the predetermined reference time and equal to or less than twice the predetermined reference time.

9. The real time control system of claim 8, wherein the operating system generates errors when the time set for the tasks is greater than twice the predetermined reference time.

10. The real time control system of claim 1, wherein a memory used to process the tasks in the digital signal processor is divided into an internal memory and an external memory in the digital signal processor, and the operating system manages the internal memory and the external memory using a memory structure made up of a start address, an end address, a memory size, a memory map, and next information indicating the start address of a next memory to be connected.

11. The real time control system of claim 10, wherein the operating system manages the memory so that the internal memory is allocated when the digital signal processor is required to perform fast processing on a task, and so that the external memory is allocated when the internal memory is completely allocated.

12. The real time control system of claim 10, wherein the operating system manages the memory so that the external memory is divided into a plurality of memories using the memory structure.

13. The real time control system of claim 10, wherein the operating system allocates and returns the memory in units of predetermined-sized pages in a system call way, and checks allocation or non-allocation of the memory on the basis of the map of a memory.

* * * * *